United States Patent
Saraf et al.

(10) Patent No.: US 12,474,289 B1
(45) Date of Patent: Nov. 18, 2025

(54) MOLECULAR BINARY PROBE TO QUANTIFY NUCLEIC ACID SEQUENCES AND MUTATIONS

(71) Applicants: Ravi Saraf, Lincoln, NE (US); Rahul Tevatia, Germantown, MD (US)

(72) Inventors: Ravi Saraf, Lincoln, NE (US); Rahul Tevatia, Germantown, MD (US)

(73) Assignee: Ravi Saraf, Lincoln, NE (US)

( * ) Notice: Subject to any disclaimer, the term of this patent is extended or adjusted under 35 U.S.C. 154(b) by 348 days.

(21) Appl. No.: 18/076,627

(22) Filed: Dec. 7, 2022

Related U.S. Application Data

(60) Provisional application No. 63/287,172, filed on Dec. 8, 2021.

(51) Int. Cl.
G01N 27/327 (2006.01)

(52) U.S. Cl.
CPC ..... *G01N 27/3276* (2013.01); *G01N 27/3277* (2013.01)

(58) Field of Classification Search
None
See application file for complete search history.

(56) References Cited

PUBLICATIONS

Y. Xiao, et al., "Single-step electronic detection of femtomolar DNA by target-induced strand displacement in an electrode-bound duplex", The Proceeding of the National Academy of Science of the USA, 103(45): p. 16677-16680, Nov. 2006.*

* cited by examiner

*Primary Examiner* — J. Christopher Ball
(74) *Attorney, Agent, or Firm* — William L. Botjer

(57) ABSTRACT

A binary probe composed of long and short nucleic acid (NA) or peptide nucleic acid (PNA) chains immobilized on an electrode to electrochemically detect specific sequences of single stranded nucleic acids extracted from biospecimens by specific binding to a single spot or and an array of spots of the probe molecules. The short chain is tethered to the electrode at one end and the other end has a covalently bound redox active compound (RAC). Part of the long chain is complimentary to the short chain to form a hydrogen bonded duplex. On specific binding of the long chain to the specific target of interest the electrochemical signal form the RAC changes due to release of the long chain. The potential applicability of the invention is in genomics to quantify certain target sequences and detect mutations for medical diagnosis, track efficacy of therapy, fundament research in life sciences, and drug development.

20 Claims, 10 Drawing Sheets

Specification includes a Sequence Listing.

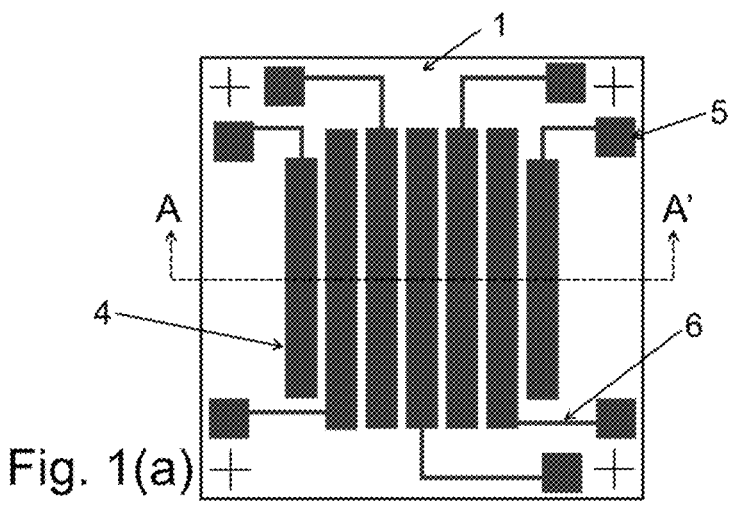
Fig. 1(a)
Fig. 1(b)
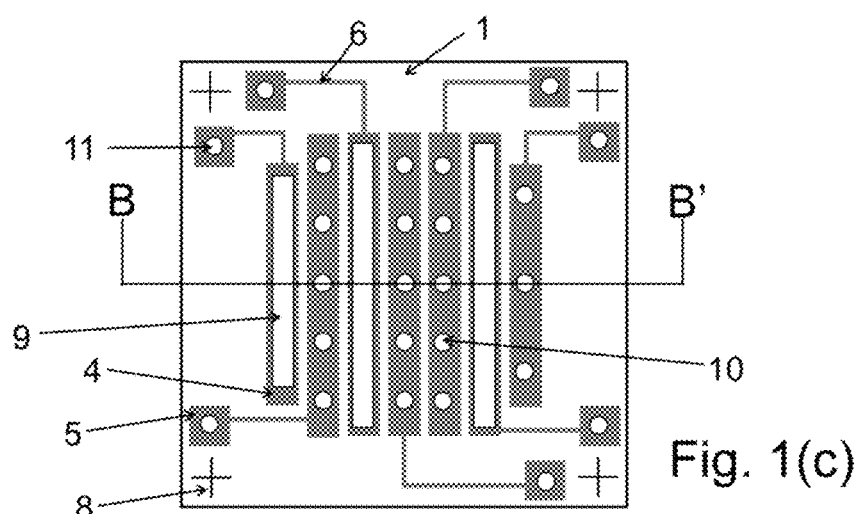
Fig. 1(c)
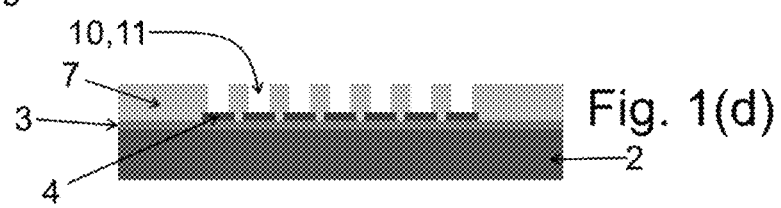
Fig. 1(d)
Figure 1

MOLECULAR BINARY PROBE TO QUANTIFY NUCLEIC ACID SEQUENCES AND MUTATIONS

REFERENCE TO RELATED APPLICATIONS

This application claims priority from U.S. provisional application Ser. No. 63/287,172 filed Dec. 8, 2021.

This application hereby incorporates by reference the disclosures of U.S. patent application Ser. No. 62/585,514 filed Mar. 13, 2017 and U.S. Pat. No. 10,815,521 B1 as if fully set forth herein.

BACKGROUND OF THE INVENTION

1. Field of the Invention

As understanding of diseases at molecular level continues to deepen, it is becoming increasingly evident that almost all diseases have genetic component. An effective emerging strategy that appears is to monitor specific genetic changes in biospecimen, such as, blood and stool, to detect diseases well before clinical signature. By monitoring the changes in specific nucleic acid (NA) targets and their fragments in biospecimens, such as tissue biopsy and liquid biopsy, it is possible to discern the efficacy and dosage of a therapy to "personalize medicine". However, most diseases, such as cancer, are complex that require analysis of multiple NA sequences for a reliable conclusion. Depending on the molecular biology of the disease, both the amount of certain specific target and the possible mutation are of interest to provide the desired medical care, such as, early intervention and personalized medicine. The present invention pertains to a method to quantitatively analyze the amount and mutations in multiple NA sequences extracted from the biospecimen. The extraction process are standard molecular biology methods known in the art.

The present invention pertains to a method to detect sequences of one or more single stranded NA's and NA fragments in a biospecimen using a binary probe composed of long and short chains. The NA in the biospecimen, for example, may be microRNA (miRNA), segment of mRNA, or fragments of DNA and RNA obtained from exosomes. The specific sequences of the single stranded (ss) NA's and NA fragments of interest, that is ssDNA and ssRNA, obtained from biospecimen are collectively termed target sequence or simply, targets, in subsequent description. Probe in the art is defined as a molecule that specifically binds to the target to cause a change in detectable signal. Measurement of the change in detectable signal allows determination of the target. Specifically, in the method, the binary probe is composed of a short and a long chain of nucleic acid (NA) or peptide nucleic acids (PNA) or their combination that is immobilized on an electrode. The short chain is tethered to the electrode underlying electrode at one end to the molecule. The other end of the short chain, subsequently called the free end, has a covalently bonded redox active compound (RAC). The short chain is tethered by a chemical bond using standard techniques, for example, gold-sulfur bond where the sulfur is on the short chain as a thio-compound and the electrode is, for example, made of gold. The long chain is bound to the short chain by hydrogen bonding over the complimentary sequence to form the well-known double helix structure. The electrode surrounding the binary probe is passivated by immobilizing an inert molecule. The inert molecule may be standard alkane chain compound used in the art, such as, mercaptan hexanol. The short and long chain double helix structure inhibits the RAC to undergo redox on the underlying electrode.

The present invention pertains to measuring the change in electrochemical signal caused by the binding between the long chain of the binary probe and the particular target sequence in the target solution. The extract solution is obtained using standard molecular biology methods to extract the nucleic acid material from biospecimen, such as blood, tissue, urine, milk, and cerebrospinal fluid (CSF), and suspending them in, typically, a buffer solution. Part of the sequence of the long chain, subsequently referred to as the active region, is complimentary to the sequence of a particular target NA of interest. On exposure to the extract solution containing the particular target extracted from the biospecimen, the long chain sequence binds to the particular target in the active region releasing it from the short chain. Subsequently, the RAC on the released short chain can undergo redox causing the electrochemical a signal to increase. From the quantitative change in the signal the concentration of the particular target in the target solution is obtained. Subsequently, from the stochiometric analysis of the molecular biological process to obtain the target solution from the biospecimen, the amount of the particular target in the biospecimen per unit weight or volume is obtained.

The present invention pertains to an array of spots of binary probes where each spot has an immobilized monolayer of a type of binary probe with a long chain that binds to a particular target sequences. The array of spots will specifically bind to multiple different particular targets in the target solution. In principle, the electrode may have one type of binary probe with long chain that binds to only one particular target NA. Typically, the electrode is patterned on an insulating surface of a flat solid substrate called the chip using standard fabrication processes derived from microelectronics fabrication processes. The chip may have multiple electrodes with corresponding circuitry to apply potential to cause an electrochemical reaction of RAC. The fabrication and design of the chip is well known in the art.

The invention pertains to measuring the kinetics of binding of a particular target to a spot of binary probe immobilized on the electrode by measuring the increase in electrochemical signal as a function of time, t. Typically, the binding between the long chain of the binary probe and the particular target is slower when in the active region between the long chain and the target is not completely complimentary, that is, there is at least one base that is not complimentary. From the slower kinetic of binding compared to the target that is 100% complimentary to the long chain of the binary probe the incidence of mutation is detected. As well known in the art, the "mutated target" is defined as change in sequence by a at least one base compared to the "normal target". The normal target sequence is 100% complementary to the long chain of the probe in the active region.

The invention pertains to measuring the electrochemical signals using established electrochemical methods in the art to quantify binding. Typically, the electrochemical signal for is measured by well-known methods in the art, such as, cyclic voltammetry (CV), differential pulse voltammetry (DPV), alternating current voltammetry (ACV), or optical methods such as, differential reflectivity (DRL) or differential interferometry (DIF). For amperometry methods, such as, CV, DPV and ACV, typically, the potential between the solution and the electrode is varied between two limiting potential and the current due to the oxidation and reduction of the RAC at the electrode is measured. Typically, for CV, ACV, DRL and DIF, the applied potential is periodic between the two limiting potentials. The electrochemical signal is the extremum reaction current due to oxidation and reduction of RAC. For optical methods, such as DRL and DIF the electrochemical signal, will also be an extremum. For amperometry method only one binary probe spot on the whole electrode is typically measured. For DRL and DIF an array of multiple spots on a single electrode can be measured by scanning the laser beam at different spots. An alternative approach known in the art to measure the electrochemical impedance of the interface between the electrode and the solution by an established methods such as, electrochemical impedance spectroscopy (EIS). Irrespective of the electrochemical method, from the quantitative change in electrochemical signal before and after binding to respective spots of the binary probes, the corresponding concentration of the particular target that specifically binds to the long chain of the binary probe is obtained.

2. Description of Related Art

Target ssDNA and ssRNA are specific molecules or their fragments obtained from biological samples, such as cells, blood, urine, sweat, saliva, CSF, and other sources, in a living system. The targets may also be synthetically made. The procedure to process the biological material to obtain the targets and reconstituting them in a buffer is well known in the art. The procedures for extraction of genomic material pertaining to the targets from biospecimen to practice this invention are part of the broad discipline of molecular biology that is established in the art.

Process to immobilizing NA or PNA probes by tethering one end to the electrode is well documented in the literature and is well known in the art. For example, microarray fabrication technology teaches methods of immobilizing single or multiple sequences on an electrode or on multiple individual electrodes. The electrodes are typically patterned on a chip as thin metallic films with circuit to power them using well established microfabrication methods known in the art. Typically for immobilization, one of the ends of the probe is modified to react with the electrode surface to cause a strong chemical bond. For example, for an Au electrode, where Au is gold, the modification on the probe may be a thio linkage, such as, —SH, where S is sulfur and H is hydrogen. The sulfur, S form a bond with the Au electrode surface. The probes form a monolayer of immobilized molecules.

The chemistry to covalently bond RAC on the NA and PNA probes are well known in the art. Typically, the redox compound may be methylene blue (MB), ferrocene or other organic dyes such as, thionine dyes, Azur chlorides, methylene blue, methyl viologen, methylene green, acridine orange, and Nile blue.

The electrochemical methods to measure the redox signal of the covalently bound RAC to NA on the underlying electrode is published in the literature and known in the art. Using a large electrode to measure one probe-target binding per electrode, Barton invented an electrochemical method to measure binding using MB (Barton et al., U.S. Pat. No. 6,221,586 B1). Saraf developed an interferometer to measure local redox reaction to obtain specific binding (Saraf et al. U.S. Pat. No. 7,826,060 B2). Saraf developed a differential reflectivity method to measure local redox reaction (Saraf et al. U.S. Pat. No. 10,962,470 and Saraf et al. U.S. Pat. No. 10,815,521 B1). Hill developed an enzyme-mediated electrochemical method to measure binding (Hill et al., U.S. Pat. No. 4,840,893). Reacting the nucleic acid with a transition metal complex, Thorp developed a method to electrochemically detect specific binding (Thorp et al., U.S. Pat. No. 5,871,918). Henkens developed an amperometric electrochemical method to measure current on binding (Henkens et al., U.S. Pat. No. 6,391,558 B1). Using a soybean peroxidase (SBP) enzyme-labeled target, de Lumley-Woodyear developed an electrochemical method to measure binding (de Lumley-Woodyear et al., US 2002/0081588 A1). Sun developed a detection system to measure binding using a field-effect transistor incorporated with nanochannels (Sun et al., US 2011/0236984 A1).

No electrochemical means exists to both quantify the amount of target concentration and mutation on the same platform. The invention pertains to a binary probe to electrochemically obtain information on the concentration of particular targets of interest and the occurrence of mutation.

SUMMARY OF THE INVENTION

The invention pertains to means to detect at least one particular sequence of target NA obtained from a biospecimen. The biospecimen may be, for example, a piece of tissue, biofluid extracted from body, portion of cell culture, or cell culture media. The NA are extracted from the biospecimen using standard molecular biology methods well known in the art and suspended in an extract solution, B1. The nature of the extract solution depends on the method. Typically, well known in the art, the extract solution, may be a buffer solution. The amount of particular targets, i, of interest in the biospecimen, typically defined as concentration, is stoichiometrically related to the concentration, $[c_i]$ in B1. Irrespective of the molecular biology process utilized known in the art, the final outcome of the extraction process is a solution, B1 with particular targets of interest, Ti of respective concentrations, $[c_i]$ in B1. The number of particular targets of interest in $B_i$ may be N, so that i=1, 2, 3 . . . N, where, i is at least 1.

The invention pertains to a binary probe immobilized on an electrode. The binary probe is composed of long and short chains of NA, PNA, or the combination of two. Typically, they are DNA or PNA. The short chain is less than 30 NA bases, preferably less than 25 bases. The long chain is less than 100 NA bases, preferably less than 50 bases. The short chain has a covalently bound RAC at one end and a compound to facilitate immobilization to the electrode on the other end. The sequence of the long chain is designed such that first part of the said long chain specifically binds to the short chain to form a duplex while the second part remains single stranded. Duplex, as known in the art, is formed due to specific hydrogen binding between complementary bases of single stand chains of DNA and DNA, RNA and RNA, and DNA and RNA. The second part of the long chain contains portion of an active region where the sequence is complementary to portion of the particular target. The type of the binary probe, Pj is primarily determined by the sequence of the said active region of the long chain that compliments to all or portion of sequence of a particular target NA, Tj. Specific binding between the long chain of probe, $P_j$ and the target, $T_i$ occurs for j=i, implying $T_i$ specifically binds to $P_i$. Typically, j for $P_j$ may be larger than N. Portion or all of the said second part of the long chain may be active region. The active region may span from second part of the long chain to overlap with some portion of the first part of the long chain.

The invention pertains to a binary probe, $P_i$ that on binding to target, $T_i$ releases the long chain from the binary probe leaving the immobilized short chain still tethered to the electrode. The binding process of the binary probe and the particular target to release the long chain from the short chain is broadly described as toe-hold displacement in the art. The toe-hold displacement in the context of the invention is the process where particular target, $T_i$ binds to the active region of the long chain causing the said long chain to release from the small chain. To facilitate the release of the long chain from short chain on binding to the particular target, multiple designs of the binary probe are possible. Without limiting the overarching goal of toe-hold displacement requirement to a particular design of the binary probe some approaches are as follows: First, the active region in the portion of the said second part is reasonably long for the particular target to bind to initiate the release of the long chain from the short chain. For reasonable toe hold, the long chain should be at least 3 bases longer than the short chain, preferably over 5 bases longer. Those in the art will appreciate that on specific binding with the particular target will be stronger than the binding between the short and the long chain making the release of the short chain energetically favorable. Second, the binding between short chain and the said first part of the long chain may have one or more bases that are not complimentary leading to weaker binding. Those in the art will appreciate that the mismatches due to non-complementarity between short and long chain will become energetically less favorable to facilitate the release of the short chain on specific binding between the active region of the long chain and the particular target. Third, the active region in the said second part of the long chain has locked-nucleic acid (LNA) monomer units to enhance the bonding energy between the particular target and the active region. Those in the art will appreciate that the higher binding energy due to LNA will make the release of short chain energetically more favorable on binding between the said active region and the particular target. Those in the art will appreciate there are other possible alternative to design the binary probe to facilitate release on specific binding by enhancing the binding strength between the said active region and the said particular NA target relative to the binding strength between the short chain and the long chain. Typically, the binding between the target and long chain in the active region is designed to be stronger than the binding between the long and short chain. Typically, the stronger binding between active region and the particular target than between long chain and short chain facilitates the release of the long chain from the short chain on binding to the particular target. The sequence of both the long and short chain is such that it does not form any secondary structure, such as folds, loops, or hairpins, i.e., the sequence is not self-binding.

The invention also pertains to a molecular brush. The molecular brush is composed of immobilized binary probe, fraction of short chain that remain unbound to corresponding long chains, and a compound passivating the exposed area of the electrode around the immobilized probes. The passivation may be by compounds well known in the art, for example, alkanethiols or simple Au—S—Au binding at the surface. Typical alkane thiol used in the art is mercaptohexanol (MCH). The Au—S—Au modification in the art is obtained by exposing the electrode to sodium sulfide solution in water. Irrespective of the method, the passivation is typically performed either between the short and long chain solution exposure, or after the immobilization of the binary probe process is completed. The process of passivation, known as backfilling, is well known in the art. The fraction of short chain unbound to long chain is preferred to be low. A higher fraction of short chain that have not formed a binary probe would lead to poor dynamic range and sensitivity to measure, $[c_i]$. The role of passivation is to inhibit chemisorption of ions from solution during the electrochemical measurement.

The invention also pertains to at least one electrode on a chip with a molecular brush comprising of at least one type of binary probe, $P_j$, where j=1. The chip is a thin solid, with a smooth, flat surface that is an insulator. Typically, the chip is Silicon with a surface layer of oxide, glass, or a ceramic insulator. Electrodes with connection circuitry are deposited on the said flat surface of the chip. Typically, the electrode and the circuitry are thin metal film with an interlayer between the electrode and the chip to ensure good adhesion. The circuitry is to apply potential on the electrode from an external source while the electrode is immersed in solution. The electrode with electrical circuit is deposited using standard microfabrication technologies known in the art using process elements such as plasma etching and cleaning, lithography, and thin film metal deposition. The design and fabrication of the electrode and circuitry are well known in the art with multiple designs. There are multiple methods described in the art to fabricate the molecular brush on the electrode. Typically, short chains are tethered to the electrode surface, followed by binding of long chain to the tethered short chain to form binary electrode, with subsequent immobilization of a compound to passivate the exposed electrode area between the probes. The sequence of the three steps may be altered, for example, the passivation step may be carried out before the binding of the long chain. Typically, the processes to fabricate the molecular brush involves solution processing. Typically, the solution of the compound being the short chain, long chain and passivating molecule are dispensed or immersed in the said solution followed by incubation. The solution may have other ions to buffer the pH and heat or cooling. Typically, the concentration of the long chain is high to ensure binding to majority of the immobilized short chains. To deposit different type of binary probes on the same electrode, referred to as array or microarray in the art, typically, microwells are patterned on a photoresist thin film deposited on the electrode using well known photolithography process. Irrespective of the process, the large variety of procedure for immobilization and binding are reported in the literature and known in the art. A large variety of fabrication process to design the electrode and circuitry are known in the art.

The invention pertains to an array of spots of molecular brush where each spot has the same type of binary probe, $P_j$. The type of probe among the spots may be different, that is, j value for probes may vary among the spots. The spots may typically be a circular, square, or rectangular in shape with a diameter, square side, or short side dimension, respectively, of 10 mm to 10 μm, more typically in 10 to 500 μm range. There are multiple methods to pattern an array of probe spots on the electrode known in the art. Typically, the spot fabrication is locally dispensing an array of micro-drops of different said solutions of small and long chain. The dispensing may be an automated dispenser or a manual where positioning may be performed manually followed by manual dispensing. Semi-automated dispenser are known in the art, where either positioning or micro drop dispensing is manual versus automated. An automated dispenser, known in the art, has a robotic arm to position and dispense the two said solutions of short chain and long chain to fabricate the binary probes on each spot with different active regions. Automated and semi-automated micro-droplet instruments to dispense an array of spots are well known in the art. For example, the electrode may be coated with a photoresist followed by etching an array of holes using photo lithography to expose the underlying electrode. Subsequently, the molecular brush is deposited on each hole by locally dispensing solutions using the process described above for molecular brush fabrication on the electrode. Each spot may have a different binary probe, $P_i$. Automated process for spotting individual dispensing of solutions are known in the art. The fabrication process in terms of processing conditions, such as, temperature, humidity, polymer solution concentrations are similar to molecular brush fabrication describe above and well known in the art. The array of spots may be patterned on the same electrode. At least one electrode on the chip may have at least one spot. The spots may be on different electrodes on the same chip. The step of backfilling of the electrode does not require local dispensing where the entire chip is immersed in solution of the passivating compound.

The invention pertains to a monolith solid to direct a solutions to a spot on the electrode to fabricate an array of molecular brush on an electrode. The monolith solid has at least one conduit to channels the solution to a specific spot on the electrode. The conduit is a fluid channel between the top surface of the solid where the fluid is dispensed and the bottom surface that opens to the electrode surface. The fluid may be inserted at the top entrance of the solid to flow down the conduit to the electrode surface. Alternatively, a syringe or a pipette tip may be guided into the conduit to dispense the fluid in close proximity to the electrode surface. The fluid is a solution. The solution may be of the said short chain in appropriate buffer for immobilization on the electrode. The solution may be of the said long chain in appropriate buffer for binding to the short chain to form the binary probe. The backfilling step, either between the short and long chain dispensing, or after the long chain dispensing to form binary probe, is by immersing the entire chip in the solution with the passivating compound. The resulting molecular brush spots formed on each spot may have different active region to bind to corresponding sequences of particular target. The monolith solid may be pressed on the electrode to form a hermetic seal around the spot dispensed on the electrode to avoid mixing of solution between the spots. The hermetic seal may be formed by incorporating a gasket with holes aligned with the opening of the conduit to facilitate dispensing on the electrode. The fluid may be dispensed at the top surface of the solid using a micropipette tip. The monolith solid may be made of plastic, ceramic, or metal. Those skilled in the art will appreciate the design of the monolith solid may be a composite of several materials.

The invention pertains to binding of at least one target, $T_i$ of concentration $[c_i]$ in $B_1$ to the chip with at least one molecular brush, $P_j$ with j=i. The binding procedure is known in the art where, typically, the chip is immersed in B1 for a certain length of time. It is well known in the art that to promote binding and maintain stability of the duplex structures, a combination of controlled mechanical and thermal energy may be applied. Experts in the art will appreciate, the chip after the binding process is washed in buffer solutions to remove unbound targets and other compounds carried over from the biospecimen. The chip may be stored in a buffer solution. Alternatively, subjected to the next procedure of measuring the electrochemical signal.

The invention pertains to measuring the electrochemical signal of the RAC on the underlying electrode. The electrochemical measurement is typically performed in a solution, $B_2$ comprising of dissolved salts in water. The solution, $B_2$ is typically a buffer of composition known in the art. For example, $B_2$ may be a phosphate buffer that is pervasively used in biology. Typically, amperometric and optical methods, or their combination are utilized to measure the electrochemical reaction rate of RAC at the underlying electrode. In amperometry methods, such as, CV, DPV, ACV the response signal is current. In optical methods, such as, DRL and DIF the response signal is amplitude of light intensity oscillation measured at the photodetector. Irrespective of the method, the response current and response light intensity exhibits an extremum value at potentials $E_O$ and $E_R$ between $B_2$ and the electrode, corresponding to oxidation and reduction of RAC at the electrode, respectively. As well known in the art, the average value of $E_O$ and $E_R$ depends on the chemistry of the RCA. The exact value of $E_O$ and $E_R$ may vary depending on the method and the measurement conditions as well appreciated in the art. For example, for DPV only one peak is observed, that is, $E_O=E_R$. For CV, DRL and DIF, the $E_O$ and $E_R$ will shift depending on rate of potential applied during the measurement. Irrespective of the method, electrochemical peak signal is the magnitude of the measured extremum value $S_O$ and $S_R$ at $E_O$ and $E_R$, respectively. Typically, only one of the two extremum values $S_O$ and $S_R$ may be considered as the electrochemical signal. Those skilled in the art will appreciate that only one spot per electrode can be measured using amperometric methods, such as, CV and DPV, while multiple spots can be measure using optical methods such as, DRL and DIF.

The invention pertains to obtaining electrochemical signal on at least one spot of molecular brush on the chip before and after binding step. Primarily, two electrochemical measurements are performed. First, the electrochemical peak signal, $S_O$ and $S_R$ is measured in $B_2$ before the chip is subjected to binding step. Typically, not all the immobilized short chains will have a long chain bound to them. As a result, before the said binding step, background signal, $R_{B,i}$, corresponding to $S_O$ and $S_R$ or their combination is measured on the spot with binary probe, $P_i$. Typically, $R_{B,i}$ is equal to $S_O$ or $S_R$ or $(S_O+S_R)/2$ for the spot with $P_i$. It is preferred that $R_{B,i}$ is measured on all the spots of the chip where binding is expected. For optical methods, such as, DRL and DIF, multiple measurement of $R_{B,i}$ on each spot should be measured to obtain statistically robust value of $R_{B,i}$. The $R_{B,i}$ is primarily from the immobilized short chains that do not have the long chain bound to them. Second, electrochemical signal, $S_O$ and $S_R$ in $B_2$ is measured after the binding of particular target, $T_i$ to the corresponding probe $P_i$. The $R_{T,i}$ is obtained from the corresponding $S_O$ and $S_R$ on the spot where binding between $P_i$ and $T_i$ occurs. The $R_{T,i}$ is obtained from the corresponding $S_O$ and $S_R$ uses the same criteria as that for $R_{B,i}$. On binding, the long chain is released from the short chin to cause the electrochemical signal to increase. The change occurs because the molecular constrain on the short chain is relaxed on release of the long chain. Typically, the reaction rate of the RAC increases due to the specific binding between the binary probe and the target causing the release of the short chain. As a result, after binding, the signal $R_{T,i}$, corresponding to $S_O$ and $S_R$ or their combination will increase, that is $R_{T,i}>R_{B,i}$. Those expert in the art will appreciate, multiple measurement of $R_{T,i}$ on each spot should be measured to obtain statistically robust value for $R_{T,i}$. Both $R_{B,i}$ and the corresponding $R_{T,i}$ value obtained are from the same spot, but not necessarily on the same exact location of the molecular brush. Those skilled in the art will realize that i could be just 1, or a larger number, N such that, i=1, 2, . . . N to obtain a set of $R_{B,i}$ and $R_{T,i}$ on a chip with single electrode having multiple spots, or multiple electrode with single spot, or multiple electrode with multiple spots. To measure electrochemical reaction on multiple spots on the same electrode, optical methods, such as DRL and DIF are suitable. Irrespective of the electrochemical method, the means to obtain the electrochemical signals, $R_{T,i}$ and $R_{B,i}$ is defined as an electrochemical reading of the chip.

The invention pertains to measuring the target concentration, $[c_i]$ from the set of electrochemical signal, $(R_{B,i}, R_{T,i})$ where i is at least 1, to a larger value of N, such that, i=1, 2, . . . N. To quantify, $[c_i]$, the change from $R_{B,i}$ to $R_{T,i}$ in the data set, $(R_{B,i}, R_{T,i})$ is computed as a parameter, $\Delta_i$. Typically, $\Delta_i$ is equal to $R_{T,i}/R_{B,i}$ or $[(R_{T,i}-R_{B,i})/R_{B,i}]$ that will monotonically increase as the $[c_i]$ of the particular target, i increases in $B_1$. The concentration, $[c]_i$ of particular target, $T_i$ is obtained from the corresponding $\Delta_i$ on specific binding to the spot with binary probe, $P_i$. The indexing values, i assigned to particular targets, $T_i$ and its corresponding binary probe, $P_i$ in general is arbitrary. On a chip, in general there may be more than one spot with the same $P_i$. As will be appreciated by expert in the art, to obtain quantitative value of $[c_i]$, a calibration curve will be obtained by using binding solutions with known value of $[c_i]_M$ and measuring corresponding electrochemical signal change, $\Delta_{i,M}$. Those skilled in the art will appreciate that the calibration curve will be obtained under identical electrochemical measurement conditions in solution $B_2$. Those skilled in the art will appreciate that to emulate the biospecimen conditions in $B_1$, large quantities of NA non-specific to the set of binary probes on the chip may be included. Those skilled in the art will appreciate that from the calibration curve data ($[c_i]_M$, $\Delta_{i,M}$) and the measured data ($\Delta_i$,i) for the corresponding target and probe index, i in $B_1$, the target concentrations, $[c_i]$ can be obtained.

The invention pertains to measuring the kinetics of binding of the particular target, $T_i$ to the corresponding binary probe, $P_i$. The kinetics binding kinetics is measured by measuring the change in electrochemical extremum signal, $S_O$ and $S_B$ during the binding process in $B_2$ as a function of time, t. Typically, the time corresponds to each cycle of the applied periodic potential during the electrochemical measurement, such as, CV, ACV, DRL, and DIF. As a result, the data set obtained is $(S_O, S_R; t_C)$, where, $t_C$ corresponds to potential cycle, that is, $t_C$=1, 2, 3, . . . . For time period of the applied electrochemical potential, Z, the real time for the kinetic data analysis is $t=Zt_C$. As a result, the kinetic data acquired from the electrochemical measurement for binding between $P_i$ binary probe and particular target, $T_i$ is represented as, $(S_O, S_R; Zt_C)_i$ where, $t_C$=1, 2, . . . and i is the index for the specific probe-targe binding on spot with $P_i$. Those skilled in the art in the art will appreciate that, typically, kinetics of only one $P_i$ can be measured on a chip, that is i=1. Those skilled in the art will also appreciate, if the kinetics of binding is slow, more than one spot on a chip can be measured by toggling the beam sequentially between multiple spots, that is kinetics for i>1 can be obtained.

The invention pertains to measuring mutation in the sequence of the particular target, $T_i$, from a biospecimen juxtaposed to unmutated sequence from a normal biospecimen, by measuring kinetics of binding. Binding kinetics data of the $(S_O, S_R; Zt_C)_p$ and $(S_O, S_R; Zt_C)_q$ are measured, where p is binding kinetics of unmutated, that is "normal" sequence, and q is the mutated sequence. The two kinetics is typically obtained on two different chips where each has the same probe, $P_i$ but the solution, $B_1$ with particular target, $T_i$ the respective chip is exposed to for binding are from is unmutated and mutated biospecimen. From the signals $(S_O, S_R; Zt_C)_p$ and $(S_O, S_R; Zt_C)_q$ the corresponding parameter, $\Delta_p$ and $\Delta_q$, respectively, for p and q target sequence is calculated as a function of t using the background signal before binding for each of the chip, criteria of obtaining electrochemical signal from $S_O$ and $S_R$, and the definition of $\Delta_i$. To compare the kinetics, typically the data may be normalized to obtain the rate of kinetics. The background extremum signal is typically independent of time, however, for their values for the two chip may be different. Among the various mutations known to experts in the art, point mutation is considered to illustrate the method using the binary probe. In point mutation, the sequence in the particular target is substituted by a different base. For example, a base sequence of portion of the target, . . . AGGTAAC . . . is altered to . . . AGATAAC . . . , where, the third base is changed from G to A. The bases, A, T, G, C are well known abbreviation for adenine, thymine, guanine, and cytosine, respectively. Similar mutations may occur in RNA. The mutation may be methylation of the base. It is known to expert in the art that mutation in the target will impede the binding process to the active region of the long chain compared to target that is that is unmutated target with sequence that is exactly complimentary to the long said binding region of the binary probe. As a result, $\Delta_p$ over t for perfect match will increase at a faster rate compared to $\Delta_q$ of mutated sequence. Alternatively, the plot may be relative difference between the normalized $\Delta_p$ and $\Delta_q$, equal to $D_{pq}$ over time. Larger the number of mutations in q-sequence compared to "normal" sequence, p, larger will be rate of increases of value of $D_{pq}$ over t. Irrespective of the data analysis method, the difference in binding kinetics between mutated and normal sequence will determine the occurrence of mutation. Optical methods, DRL and DIF are preferred over amperometric method as the time period of the cycle, Z may be shorter to achieve shorter sampling time intervals, $Zt_C$. Experts in the art will realize to obtain the kinetics of "normal" sequence of a particular target, $T_i$, control experiments from biospecimen with no mutation is required. Unmutated biospecimen may be obtained from normal patient, cell culture, or synthesized synthetically. Experts in the art will appreciate that to measure kinetics of multiple particular targets, $T_i$, where i is larger than 1, typically, multiple chip will be required. Those skilled in the art will appreciate, if the kinetics of binding is slow, more than one spot can be measured by toggling the beam sequentially between multiple spots.

In summary, the disclosed art is a versatile method based on molecular binary probe and electrochemical reading with two distinct applications, to measure the number of targets of particular sequences in a biospecimen, and mutation in the target sequence. The electrochemical reading is from the redox reaction of an RAC attached to the binary probe immobilized on an electrode. In the first application, using calibration curve and the stoichiometry to extract the targets from the biospecimen, the amount of particular targets, $T_i$ per unit volume or mass of the biospecimen is obtained. At least one target sequence is quantified on a chip, that is i=1. Using standard microarray processing, an array of binary probes are immobilized on the chip that specifically bind to different targets of interest in $B_1$ leading determination of more than one target, $T_i$, that is i>1 per chip, is obtained. In the second application, the amount of binding to a binary probe specific to one particular target, $T_i$ as a function of time is obtained by electrochemical reading. From the binding rate obtained mutation in the target relative to unmutated target is obtained. Thus, put all together, the invention pertains to a binary probe immobilized on an electrode to electrochemically determine, the amount of one or more targets, mutation in a target sequence, and a combination of both amount and mutation. The key invention is a unified platform that allows both quantitative measurement of target and determination of mutation.

BRIEF DESCRIPTION OF THE DRAWINGS

The accompanying drawings, which are incorporated in and constitute a part of this specification, illustrate one embodiment of the invention and together with the written description, serve to explain certain principles and features of the invention.

FIG. 1: FIG. 1(a) Schematic of a typical chip with circuit lines for interconnection to electronics for power and signal; FIG. 1(b) a cross-sectional view of A-A'; FIG. 1(c) microwell etched in photoresist by photolithography process on the electrodes; and FIG. 1(d) cross-sectional view of B-B'.

DETAILED DESCRIPTION OF PREFERRED

Embodiments of the Invention

Figure 2:
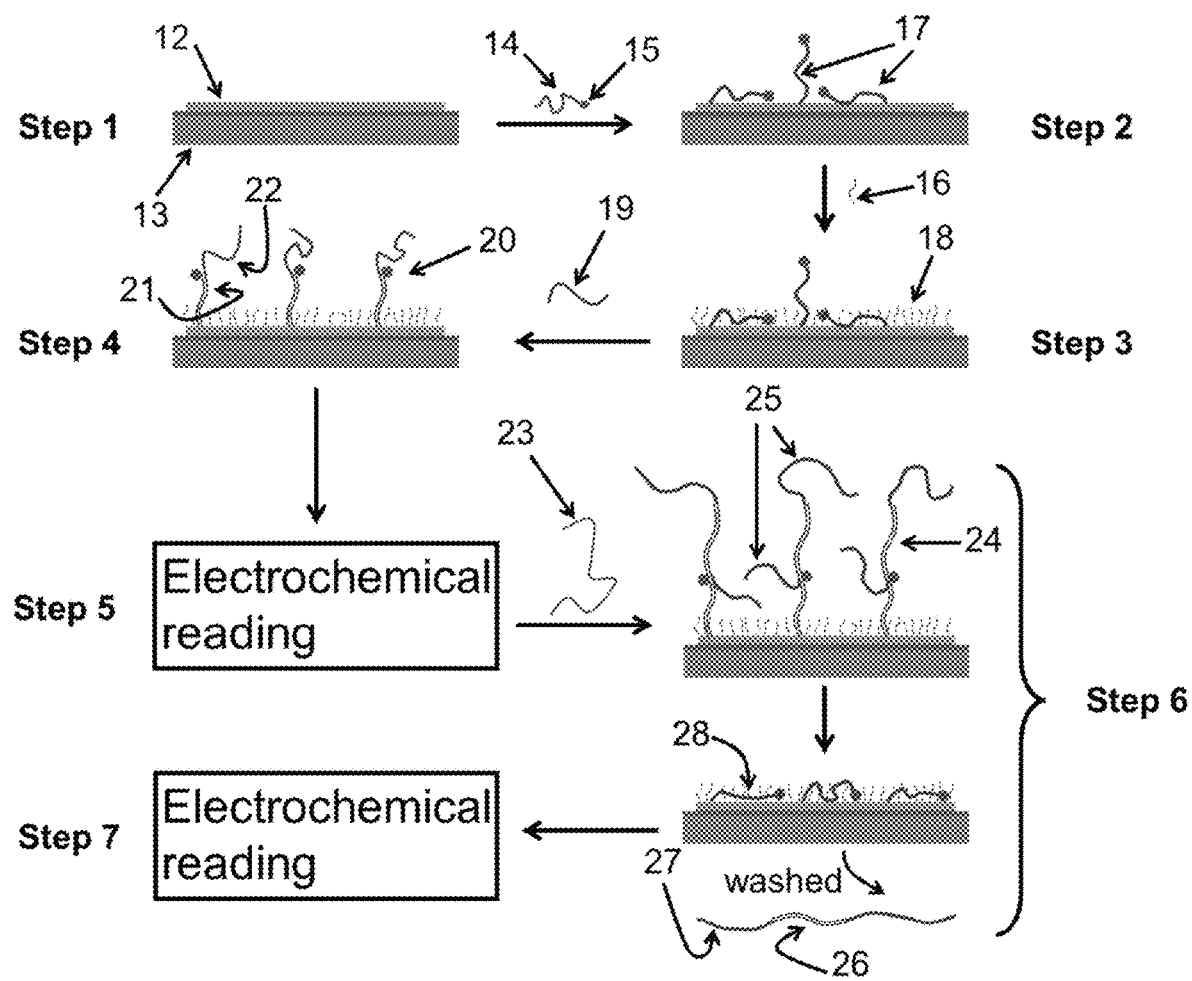
FIG. 2: Schematic of a typical fabrication process of molecular brush on an electrode.

Reference will now be made in detail to various exemplary embodiments of this invention, examples of which are illustrated in the accompanying drawings. The following detailed description should not be understood as a limitation on the scope of this invention but should rather be considered as it is intended—to provide details on certain features and aspects of the invention. Significantly specific details on the conditions and details of the chip design, binary probe design, molecular brush fabrication, particular target and binary probe binding, electrochemical reading, and kinetics measurement will be described to illustrate the invention; however, it should not be construed as limiting. Those skilled in the art will appreciate variations in the design and process to achieve the intended goal of obtaining data on specific binding to analyze for a relative amount of one or more target sequences in the solution and binding kinetics to analyze occurrence of mutation.

The details below include examples to demonstrate the translation of the principles of the invention to practice. The illustrations below exemplify some designs of the chip to obtain data on specific binding for specific electrochemical methods. The specific design considered will underscore the concept of the invention to practice the method that is mediated by redox of RAC to quantify the level of binding.

To demonstrate the concept of the invention, a simple device is considered that is comprised of a chip (1) shown in a schematic (FIG. 1). The relevant structure of the chip for the invention is shown as the top view (FIG. 1(a)) and cross-sectional view about the A-A' section (FIG. 1(b)). The chip (1) is a solid composed of a substrate (2) with an insulator layer (3) to isolate the electrodes (4). In principle, the additional insulating layer (3) is not required if the substrate (2) is an insulator, such as glass. Typically, the substrate (2) is Si and the insulator layer (3) is oxide of Si. The patterned electrodes (4) have good adhesion to the substrate surface so that they can withstand the conditions of device processing and operation. The patterned electrodes (4) are connected to terminal pads (5) via an electrical circuit (6). Typically, the electrodes (4), circuit (6), and terminal pads (5) are fabricated by well-established photolithography process used in microfabrication technology known in the art.

To avoid the shorting of circuit lines and the electrodes by the electrolyte solution used for electrochemical analysis a typical process is selectively coat the electrode and the circuit by photolithography (FIG. 1(c)). The chip (1) is coated with a photoresist (7). The photoresist is typically 0.1 to 10 μm thick. Patterns are etched on the photoresist using alignment markers (8). After photolithography, the etched patterns (9,10,11) expose the underlying electrode while the rest of the chip (1) is covered with the insulating layer of the photoresist (cross-section B-B' in FIG. 1(d)). Typically, to ensure clean electrode surface, the chip is subjected to Oxygen plasma to clean any residue photoresist. For demonstration, two patterned shapes are shown: a macroscopic feature exposing virtually the whole electrode (9) and a smaller circular region (10). Although the longest and smallest dimension of the etched features (9,10) can overall range from 10 nm to 10 mm, typically, the average feature size of a circular shape are about 50 to 500 μm in diameter and the larger features are close to the electrode length with width of about 1 mm. To ensure good connections to the exposed electrode, the photo resist on the terminal pads (5) are also etched (11). The circuit lines (6) are covered with the photoresist (7) to avoid shorting between the electrodes. To perform the electrochemical analysis the chip is typically in a special chamber such that the terminal pads (5) are outside the chamber while the electrolyte solution is in contact with the interior part of the chip. Typically, the solution in the chamber is hermetically sealed using an 'O' ring. The terminal pads with exposed electrode (11) provides the connectivity to the electrodes (4) for application of potential and allow flow of electric current. The design of the chip is not unique. For example, those skilled in the art will appreciate that several other designs are possible. For example, a multilayer design may be possible where electrodes, part of the circuit lines, and terminal pads may be on a different insulator layer that is hermetically sealed so that only the exposed area of the electrode is in contact with liquid for electrochemical operation. Such multilayer structures are well known in the art pertaining to Silicon technology-based devices.

To illustrate the invention, a specific example is considered (FIG. 2). A reasonably general starting point to describe the fabrication of the binary probe and the backfilling process to fabricate the molecular brush is to consider one etched feature (10) exposing the underlying electrode (11) in FIG. 2. Thus, the exposed electrode (12) on the substrate (13) is the starting point for molecular brush fabrication. Those skilled in the art will appreciate, other spots of exposed electrodes in FIG. 2 are fabricated in an identical process. The sequence of short and long chains at different spots can be varied to fabricate a microarray. Those expert in the art will appreciate that for a single probe on the whole electrode (4) in FIG. 1(a), the photolithography step to etch feature (9) and (10) in FIG. 1(c) is not necessary. Irrespective of the shape of the exposed electrode, typical processing steps to fabricate the molecular brush are illustrated in FIG. 2.

To fabricate the molecular brush, solutions of different type will be dispensed on the exposed spot of electrode (12). Those expert in the art will appreciate that for multiple spots with different probe sequences the solution will be dispensed as a local while for a single type of binary probe on a chip with a single electrode the whole chip may be immersed in the solution rather than dispensing the drop. As well known in the art, the local dispensing of the drops of various solution may be manual to fully automated. Irrespective of the deposition method, FIG. 2 will illustrate a process to fabricate the molecular brush of at least one binary probe, $P_i$ on an electrode.

To illustrate the fabrication process in the first step the exposed electrode (12) is cleaned for any residual contamination that can obstruct the immobilization of short chain on the said electrode. Typically, the electrode is a Nobel metal surface such as, Au, Pd, Pt, or this alloys with other elements. The cleaning is typically performed by oxygen plasma followed by hydrogen plasma. The chip is washed in deionized (DI) water to avoid ion contamination.

In the second step in FIG. 2, the clean electrode (12) is exposed to a solution of short chains (14) by dispensed a drop or immersing in the said solution. The contact is allowed for typically over 15 minutes for the immobilization reaction between the electrode and short chain to occur. Heating would facilitate the reaction rate. Typically, the short chain (14) has RAC (15) tethered at the free end and a reactive group at the other end to covalently attach to the electrode (12). Typically, the RAC is methylene blue (MB) or other redox active dyes well known in the art. Typically, the reactive end to covalently attach to the electrode is a thio-group, such as, SH— that readily attached to electrode surface, typically made of Nobel metal and their alloys. It is known in the art that to facilitate the subsequent binding to long chain, a flexible spacer of methylene chains is introduced. Typically, the flexible spacer is 3 to 14 methylene units long. As a result, a typical generic chemical formula of the short chain is, HS—$(CH_2)_n$-[Probe sequence]-$(CH_2)_m$-MB, where n ranges from 3 to 12 and m ranges from 0 to 12. After the immobilization step the chip is washed in buffer with typical pH preferably in 6 to 10 range made in DI water free from DNAse and RNAse enzymes.

In the third step in FIG. 2, the electrode (12) with the immobilized short chains (14) is exposed to a solution of passivation compound (16) to back fill the unoccupied area of the electrode (12). Typically, the passivation compound known in the art are alkane thiols where one end of the alkane chain is a thio-group, HS— that covalently binds to the Nobel metal electrode while the free end and the rest of the molecule in electrostatically neutral and chemically inert. In the backfilling step the said solution of passivating compound (16) is allowed to be in contact with the electrode (12) for, typically, over 5 minutes to allow for covalent bonding between the said compound and the said electrode. The result is an immobilized monolayer structure with short chains (17) and passivation compound (18) covalently tethered to the electrode (12). The short chains have a heterogenous conformation where some chains adsorb on the electrode while some are standing up. The short chains (17) with smaller length, that is fewer nucleotide (nt) monomer units, have a higher tendency to a lay down. The number of nt units is equivalent to number of bases or sequence length of the chain. The chains lay down primarily due to electrostatic interaction between the negatively charged short chain and the electrode, and the interaction between the bases and the electrode (12). After the third step the chip is washed in buffer with typical pH preferably in 6 to 10 range made in DI water free from DNAse and RNAse enzymes.

In the fourth step in FIG. 2, the electrode (12) with the immobilized short chain (17) and passivation compound (18) for backfilling is exposed to the long chain (19). The binding occurs to form the binary probe (20). The first part of the long chain (21) forms a duplex with the short chain while the second part (22) of the long chain remains free. Typically, high concentration of long chains is used to ensure that most of short chains bind to long chain to form the binary probe (20). Typically, the concentration of the long chain solution is 2-fold to 100-fold more concentrated than short chain solution. The long chain is more than three nucleotides longer than the short chain, preferably more than five bases longer. Similar to the previous two steps, the solution is allowed to make contact with the electrode for more than two minutes to allow binding to form binary probes (20). The binding is a duplex formation between the complimentary bases of the long and short chain. At the end of the fourth the molecular brush of binary probe $P_i$ is formed. Those expert in the art will appreciate by locally dispensing solutions in steps two to four, spots of molecular brush with different sequence of binary probes can be fabricated. The chip may be stored after the fourth step. To store the chip, as known in the art, a buffer with salt concentration above 10 millimolar (mM), preferably 100 mM is used. The high salt concentration improves the stability of the duplex binding between the complimentary bases of the short and long chains. After the immobilization step the chip is washed in buffer with typical pH preferably in 6 to 10 range made in DI water free from DNAse and RNAse enzymes. To avoid de-binding of short and long chain during washing the salt content of the buffer is over 10 mM, preferably over 100 mM.

In the fifth step in FIG. 2, electrochemical reading of the molecular brush with the binary probes (20) and backfilling. The electrochemical reading is performed in solution $B_2$ to obtain electrochemical signal, $R_{B,i}$ corresponding to binary prob $P_i$. The electrochemical signal, $R_{B,i}$ may be obtained from amperometric methods, such as, DPC, CV, and ACV, or optical methods, DRL and DIF, or a combination of optical and amperometric methods. For optical method that measured local electrochemical signal, such as, DRL and DIF, those skilled in the art will appreciate that more than one location on a molecular brush spot is performed to obtain an average value. If a probe of single type, $P_i$ is immobilized, that is i=1, on an electrode both amperometric and optical methods can be used. However, for multiple probe spots on an electrode, that is, $P_i$ with i>1 the electrochemical signal, $R_{B,i}$ is obtained by optical methods. The salt concentration of $B_2$ solution is preferred to be over 100 mM to maintain stability of short and long chain duplex. A finite $R_{B,i}$ may be observed because some of the short chains that do not form a binary probe are adsorbed on the electrode bringing RAC in close proximity to the electrode to cause an electrochemical redox reaction. Thus, the $R_{B,i}$ may be referred to as background or baseline electrochemical signal.

In the sixth step in FIG. 2, the whole chip is immersed in the solution $B_1$ of targets. The immersion will cause specific binding between the particular target, $T_i$ (23) to the probe, $P_i$ (20). The particular target (23) binds over the active region of the long chain (19) which primarily is the second part of the long chain (22). The active region may extend to the part of long chain that formed duplex with the short chain. The result is a triplet structure of short chain, long chain, and the target (24), where the active region of the long chains forms a duplex with the targeted sequence of $T_i$ while most of the first part of the long chain remains to form a duplex with the small chain. The active region may extend to long-short chain duplex. The targeted region of $T_i$ that binds to the active region of the long chain may be a sequence in a portion of the target such that the target chain in the triplet structure (24) extends as free chain (25) on one or both sides of the active region of binding. Similar to steps two to four, the solution is in contact with the chip for over 1 minute, preferably over 15 minutes. As in Steps 2 and 3, to improve the kinetics of binding the chip may be heated to temperatures up to the point that the duplex between long and short chain does not de-bind, a process referred as duplex melting in the art. Preferably the typical temperature is below 70° C. Subsequently, the binding between long chain and the target in active region results in the release of the long chain (26) bound to target (27). Most of the short chains released from the long chain (28) adsorb on the electrode bringing the RAC (15) in close proximity to the electrode. This propensity of the released short chains (28) to adsorb back to the electrode (12) increase as length of the short chain decreases. The chip is washed in a solution that is typically, a high ionic strength buffer with pH in 6 to 10 range. The solution may be similar to $B_2$. The washing is to remove all the unbound or weekly bound biomolecules in the extract solution, $B_1$. The high ionic strength is to maintain the stability of the duplex, that is, the binary probes.

In the seventh step in FIG. 2, electrochemical reading of the resulting molecular brush after the binding step is performed. The electrochemical reading is performed in solution $B_2$ to obtain electrochemical signal, $R_{T,i}$ corresponding to increase in in signal due binding between binary prob $P_i$ and particular target, $T_i$. The increase in signal occurs because the released short chain (28) due to binding with the target adsorb on to the electrode (12) to bring the RAC (15) closer to the electrode. As a result, $(R_{T,i}-R_{B,i})$ is positive, where both $R_{T,i}$ and $R_{B,i}$ are measured on the same molecular brush spot. The electrochemical signal, $R_{T,i}$ may be obtained from amperometric methods, such as, DPC, CV, and ACV, or optical methods, DRL and DIF, or a combination of optical and amperometric methods. For optical method that measured local electrochemical signal, such as, DRL and DIF, those skilled in the art will appreciate that more than one location on a molecular brush spot is performed to obtain an average value. Those skilled in the art will appreciate that the location of measurement of $R_{T,i}$ and $R_{B,i}$ are on the same spot but may be at different locations. If a probe of single type, $P_i$ is immobilized, that is i=1, on an electrode both amperometric and optical methods can be used. However, for multiple probe spots on an electrode, that is, $P_i$ with i>1 the electrochemical signal, $R_{T,i}$ is obtained by optical methods. The salt concentration of $B_2$ solution is preferred to be over 100 mM to maintain stability of short and long chain duplex. The $R_{T,i}$ may be referred to as binding electrochemical signal. Those skilled in the art will appreciate that if $R_{B,i}$ for a particular probe, $P_i$ remains nominally constant with low variation between chip, the $R_{T,i}$ provides a reasonable relative trend on change in $[c_i]$.

From $(R_{B,i}, R_{T,i})$ data obtained on molecular brush spot with probe $P_i$ using the abovementioned seven steps in FIG. 2, $[c_i]$ may be obtained. The index i is at least 1, and may be of a larger value of N, such that, i=1, 2, ... N. The spots may be on the same electrode or multiple electrodes on the chip. From the $(R_{B,i}, R_{T,i})$ data, $\Delta_i$ is equal to $R_{T,i}/R_{B,i}$ or $[(R_{T,i}-R_{B,i})/R_{B,i}]$ is calculated. Using the same seven steps in FIG. 2, the calibration curve for each target $T_i$ is obtained. To obtain the calibration curve, an emulated extract solution, $B_{1M}([c_i]_M)$ with known concentration, $[c_i]_M$ of at least one particular target, $T_i$ is prepared. A series $B_{1M}([c_i]_M)$ for different $[c_i]_M$ are prepared. Those skilled in the art will appreciate that, to emulate the $B_1$ from biospecimen that would typically have exogenous biomolecules that may interfere with the binding process in step 6 in FIG. 2, in $B_{1M}([c_i]_M)$, similar compounds and sequence of target molecules that do not binds to $P_i$ may be included to obtain a calibration curve that is more accurate for analysis of $[c_i]$. Those skilled in the art will appreciate, the particular targets in $B_{1M}([c_i]_M)$ are synthetically prepared, so that the $[c_i]_M$ is known. Those skilled in the art will appreciate that the complex targets that cannot be made synthetically may be separated in large quantities form similar biospecimen and quantified by alternative methods, such as quantitative polymerase chain reaction (qPCR) to make stock solution of known concentration of the particular targets of interest to make $B_{1M}([c_i]_M)$ for calibration. By sequential dilution the $[c_i]_M$ can be regulated to obtain the calibration curve, similar to that from synthetic targets. Irrespective of the approach, a calibration curve $[c_i]_M$ versus $\Delta_{i,M}$ is obtained, where, $\Delta_{i,M}$ as a function of known $[c_i]_M$ is obtained. As a result, the measured $\Delta_i$ can be interpolated in calibration curve data, $([c_i]_M, \Delta_{i,M})$ to obtain $[c_i]$.

Those in the art will appreciate that the calibration curves, $([c_i]_M, \Delta_{i,M})$ for each probe-target pair, $(P_i, T_i)$ may be reasonably universal irrespective of the exogenous biomolecules that are present in $B_1$ as long as the nature of the biospecimen is similar and the corresponding $B_{1M}$ reasonably emulates $B_1$. Those skilled in the art will appreciate that once the calibration curve, $([c_i]_M, \Delta_{i,M})$ is obtained for a given $(P_i, T_i)$ pair, it can be applied a broad class of biospecimen to quantity $[c_i]$ in $B_1$ and therefore, in the biospecimen by knowing the stoichiometry of the nucleic acid extraction process to make $B_1$ from the biospecimen. Those in the art will appreciate that, similar biospecimens may be cell culture supernatant from different cells in two-dimension or three-dimension geometries; tissue sample from similar class of cells; and same type of biospecimen from different patients. The same type of biospecimen from different patients may be blood, urine, milk, stool, CSF, and sweat.

To measure the kinetics of binding between $(P_i, T_i)$ pair for a particular target, $T_i$ a chip with molecular brush composed of single probe, $P_i$ is fabricated using the seven steps in FIG. 2. Typically, for kinetics measurement only one spot per chip is measured. Those skilled in the art will appreciate, if the kinetics of binding is slow, more than one spot can be measured by toggling the beam sequentially between multiple spots. Two chips with same probe $P_i$ is fabricated using steps one to five in FIG. 2. For the sixth step in FIG. 2, one chip is immersed in $B_1$ solution processed from normal biospecimen where no mutation is expected, while the second chip is immersed in the biospecimen where a mutation may have occurred on particular target of interest. In the seventh step in FIG. 2, the electrochemical extremum signal for the two chips is measured as a function of time to obtain $(S_O, S_R; Zt_C)_p$ and $(S_O, S_R; Zt_C)_q$ for chip exposed to unmutated and mutated target, respectively. Unlike the step 6 in FIG. 2, the measurement is performed in $B_1$ during binding. Using the temporal signals, corresponding measured background signals for each of the two chips, the criteria to obtain the electrochemical signal, and the background corrected electrochemical signal for first and second chip, $(\Delta_p, Zt_C)$ and $(\Delta_q, Zt_C)$. The background signal is measured in equivalent $B_2$ solution without the target molecules. The mutation is determined if $D_{pq}=(\Delta_p-\Delta_q)/\Delta_p$ grows over binding time. The exact increase in the amount of $D_{pq}$ and its growth over time depends on the particular target of interest and the probe. Typically, a value of $D_{pq}$ above 0.1 over binding time greater than one hour may be considered a possible incidence of mutation.

Figure 3:
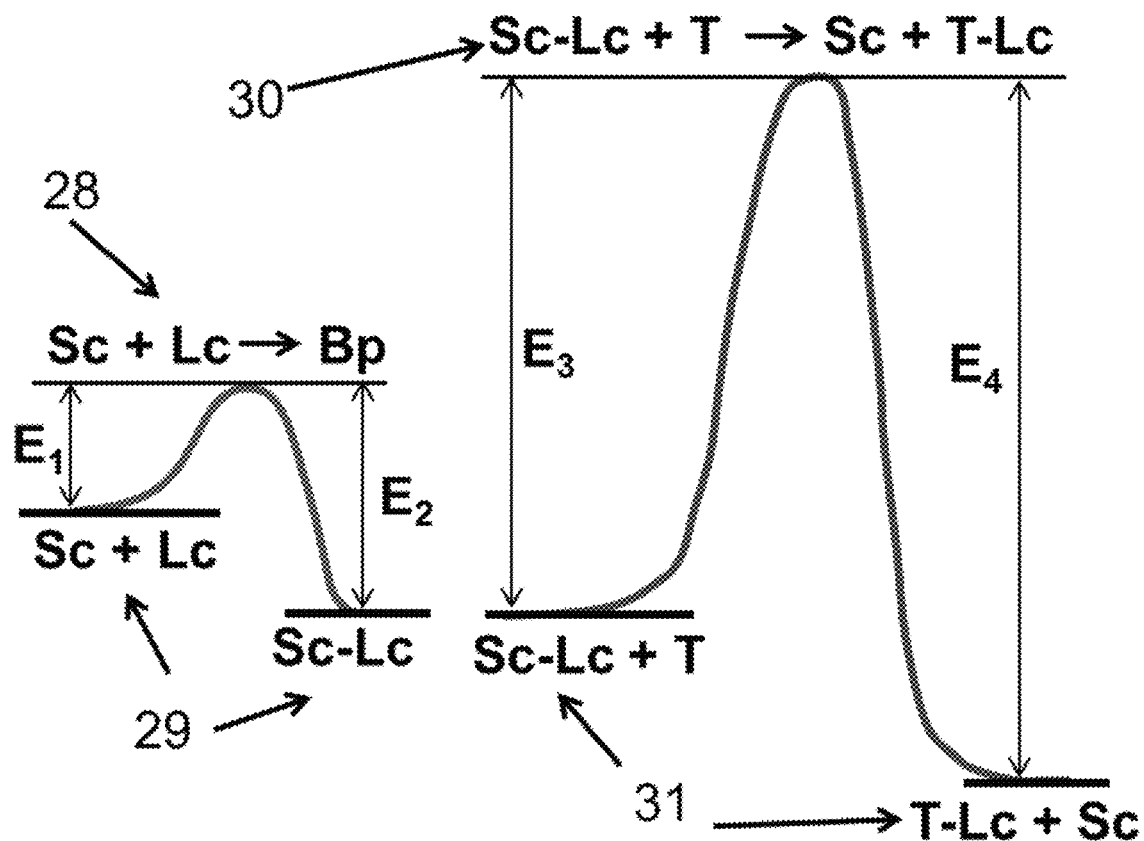
FIG. 3: Schematic of the free energy diagram of various state of the binary probe during fabrication and binding.

Next specific details to design of binary probe will be described. The specific concepts enumerated are to illustrate some of the many ways design the binary probe. It will apparent to the expert in the art there are other principles to design the binary by combining some the principles and including some of the other principles known in the art. There are two central energetics that govern the invention principle of measuring $[c_i]$ and mutation in the extracted solution of targets and may be depicted by a free energy diagram schematic shown in FIG. 3. First, the duplex formation is a reaction, (28), where the long chain (Lc) plus the short chain (Sc) leads to a binary probe (Bp). The process should be thermodynamically favorable as represented by lowering of the free energy from $E_1$ to $E_2$ (29). The activation barrier, $E_1$ that governs the kinetic of binding should be small to cause the reaction at a fast rate. The $E_2-E_1$ should be large enough so the reaction is not reversible. If k is the Boltzmann constant and T is temperature of reaction in Kelvins, then, $E_1>10$ KT and $E_2-E_1>10$ kT. The long and short chain should bind over at least 5 bases, preferably over 7 bases. This process of forming the binary probe is Step 4 in FIG. 2. Second, the exchange reaction between the Bp and the target (T) to release the Sc and form a duplex between T-Lc (30). The process should be thermodynamically favorable as represented by lowering of the free energy from $E_3$ to $E_4$ (31). The activation barrier, $E_3$ that governs the kinetic of binding should be small to cause the reaction at a fast enough rate. Typically, for a controlled displacement reaction, $(E_4-E_3)>(E_2-E_1)$. This process of displacement rection is Step 6 in FIG. 2. Based on two central energetics: (a) For the overall displacement reaction to be thermodynamically favorable, the driving force, $(E_4-E_3)>(E_2-E_1)$. The active region should be at least 6 bases long, preferably over 8 bases long. (b) Smaller $[c_i]$ can be measured as $E_3$ decreases, that is, the sensitivity increases as the displacement reaction rate decreases. As the diplex formation is essentially a series of hydrogen bonding between complimentary base reactions, from the Bell-Evans-Polanyi principle larger the thermodynamic driver, $(E_4-E_3)$, smaller is the activation barrier, $E_3$. Thus, the design criteria of the binary probe is that the binding energy of T-Lc should be significantly stronger the binding energy of Sc-Lc. Third, for a reasonable toe-hold by the target to bind to long chain in the active region, the long chain should Using the above the analysis of the energetics of the process some examples of design rules of the binary probe may be as follows. First, to have the binding energy for duplex formation between target and long chain to be higher than long and short chain, that is, $(E_4-E_3)>(E_2-E_1)$ following approach may be possible: (i) The length of the active region for binding between long chain and target is longer than long and short chain. (ii) free-end of the long chain (22) may have few LNA units to increase $(E_4-E_3)$. (iii) The G-C fraction of the region binding the long and short chain (21) is low to reduce $(E_2-E_1)$. (iv) The region binding the long and short chain (21) has at least one mismatch to reduce $(E_2-E_1)$. Second, to facilitate the release of short chain from the long chain due to displacement reaction, the active region extends into the binding region (21) of the long and short chain. Third, to facilitate the kinetics of displacement, the temperature may be increased to the extent that spontaneous melting of the binary probe does not occur. The above list are merely some examples. Applying other known principle in the art guided by toe-hold reaction studies and the energetics of the process described in FIG. 3, more design rules can be generated without limiting the underlying principle of the disclosed method to measure $[c_i]$ and binding kinetics.

Specific examples, Example 1 to 7, are considered to demonstrate the invention. For all these examples, the chip was 10 by 10 mm Si chip with 500 nm thick thermal oxide to make the surface of the chip insulating. The electrode pattern was made by photolithography process similar to FIG. 1. The top surface of the electrode was Au. The chip was covered with SU8 photoresist and developed to have etched features similar to FIGS. 1(c) and 1(d). The features in Example 1 to 6 were 200 μm holes, similar to (10) in FIG. 1(c). An expert in the art will appreciate that the design of the chip is not unique and may be altered to obtain similar results.

After the photolithography step to obtain the said 200 μm microhole features, for Step 1 in FIG. 2, the electrode was cleaned in $O_2$ and $H_2$ plasma for 2 minutes each immediately before the molecular brush fabrication. In Step 2 in FIG. 2, the short chain was immobilized on exposed Au using 10 μM solution of Sc in 1 M Sodium Acetate (NaAc) buffer at pH of 7.2. The solutions were locally dispensed on the microhole and allowed to incubate for 1 hour for immobilization via Au—S bond. Subsequently, after washing in DNAase-free water, in Step 3 in FIG. 2, the electrode was backfilled by 0.1 mM of MCH in 1 mM NaAc at pH of 7.2 for 10 minutes. In Step 4 in FIG. 2, the binding with 1 μM solution of long chain in 1 M NaAc was locally dispensed on the microholes and allowed to incubate for two hours to form the molecular brush. In Step 6, the binding to target was in 1 M NaAc solution performed at similar condition as Step 4 in FIG. 2. The concentration of the target was varied as indicated in the examples. The RAC on the short chain is MB.

For Steps 5 and 6 in FIG. 2, the electrochemical measurements were performed optically by DRL described in detail in a publication, R. Tevatia, A. Prasad, and R. F. Saraf, *Analytical Chemistry*, 91, 10501-10508 (2019). The instrument to perform the said DRL is called the Scanning Electrometer for Electrical Double-layer (SEED). The reference electrode was Ag/AgCl and the counter electrode was Pt. The RAC was MB. The electrochemical signal obtained was obtained differential reflectivity amplitude during oxidation and reduction of MB during the application periodic potential between, E, ramped linearly between −0.45 and +0.1. The time period of the cyclic potential, Z=1 s. The differential reflectivity, R as a function of E was due to an AC potential applied at a frequency of 500 Hz and an amplitude of 0.1 V. An expert in the art will appreciate the electrochemical analytical method, SEED and the measurement conditions can be altered to yield similar results.

The short chain, long chain, and target molecules used for Examples 1 to 6 described below, were all synthetic. Thus, the concentration of the target was known. The specific sequence to demonstrate the Examples 1 to 6 method were combination of the following sequences:

```
Short chains (Sc):
S1: 5'-HS-(CH2)6- AAC CCC TAT CAC GAT-MB miR155

S2: 5'-HS-(CH2)6-AAC CCC TAT CAC GAT TAG CAT
TAA-MB miR155
```

-continued

```
S3: 5'-HS-(CH₂)₆-ACA ACC AGC TAA GAC ACT GCC A-
MB miR34a

S4: 5'-HS-(CH₂)₆-CAC TGC ACC GCG-MB 92b

S5: 5'-HS-(CH₂)₆-TGC CCT ACT CTT CGC-MB cel58

Long chain (Lc):
    L1: 5'-TTA ATG CTA ATC GTG ATA GGG GTT-3'

L2: 5'-AGG GAC GGG ACG CGG TGC AGT G-3'

L3: 5'-GAT GAG ATG CGA AGA GTA GGG CA-3'

Target (T):
    T1: 5'-AAC CCC TAT CAC GAT TAG CAT TAA-3'

T2: 5'-TGC CCT ACT CTT CGC ATC TCA TC-3'

T3: 5'-TGC CCT ACT CTT CGC ATC TGA TC-3'
```

Figure 4:
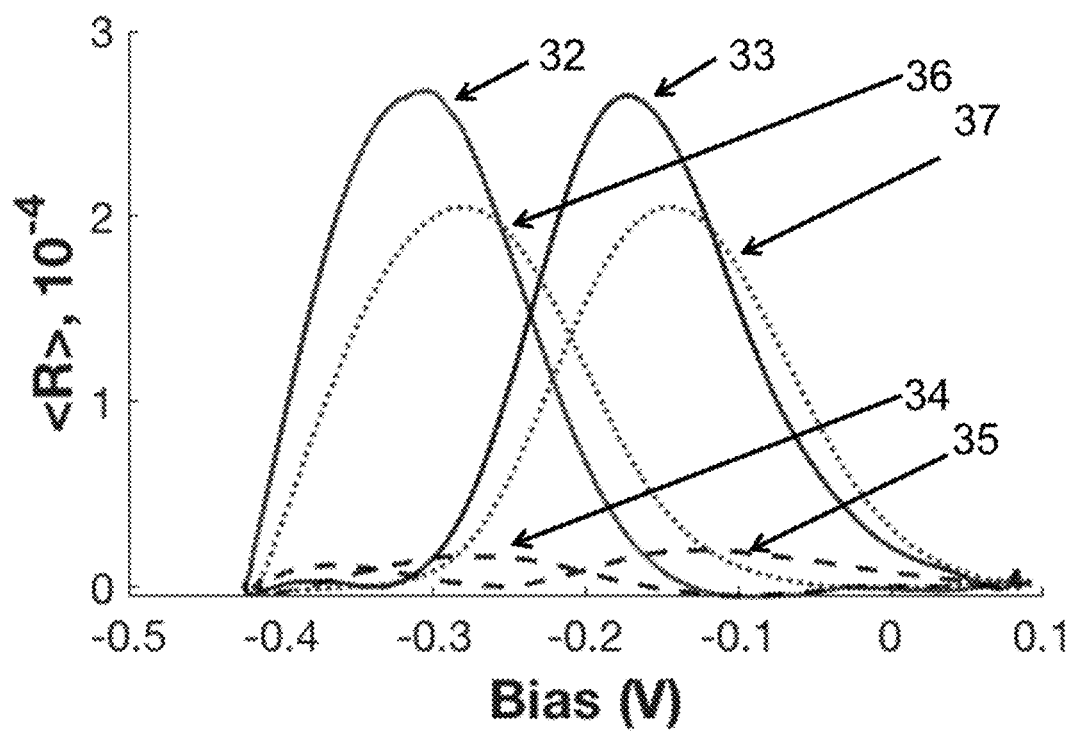
FIG. 4: Data demonstrating the change in electrochemical signal obtained by SEED due to binding between long chain and target.

An XML sequence listing corresponding to the above sequence listing entitled "18076627sequencelisting" (size 10,750 bytes) was created and filed with the USPTO on Apr. 28, 2023, Example 1: Demonstration of Positive Contrast on Binding The SEED signal in FIG. 4 was measured after Steps 1 to 3 in FIG. 2. The SEED signal was due to reduction (32) and oxidation (33) of MB. The short chain was S1. The peaks of the SEED signal for reduction (29) and oxidation (30) may be considered the electrochemical signal. In Step 4 in FIG. 2, the long chain L1 was dispensed on the spots to form the binary probes. In Step 5 in FIG. 2, the reduction (34) and oxidation (35) peaks measured by SEED was significantly reduced. The reduction was attributed to the S1 desorption from the Au electrode due to S1-L1 duplex formation that inhibits the redox of MB. In Step 6 in FIG. 2 the binary probe was exposed to 1 µM of T1. In Step 7 in FIG. 2, the resulting SEED signal was measured after binding to observe a significant increase in reduction (36) and oxidation (37) signal. The increase in signal was attributed to the release of S1 caused by L1-T1 binding as schematically shown in FIG. 2. The full recovery to (32) and (33) was not obtained because not all the S1 was released. The observation after each step was consistent with the process flow and mechanism described in FIG. 2. Because the reduction and oxidation peaks increase from (34) to (36) and (35) to 37), respectively, the contrast due to binding positive, that is positive contrast.

Figure 5:
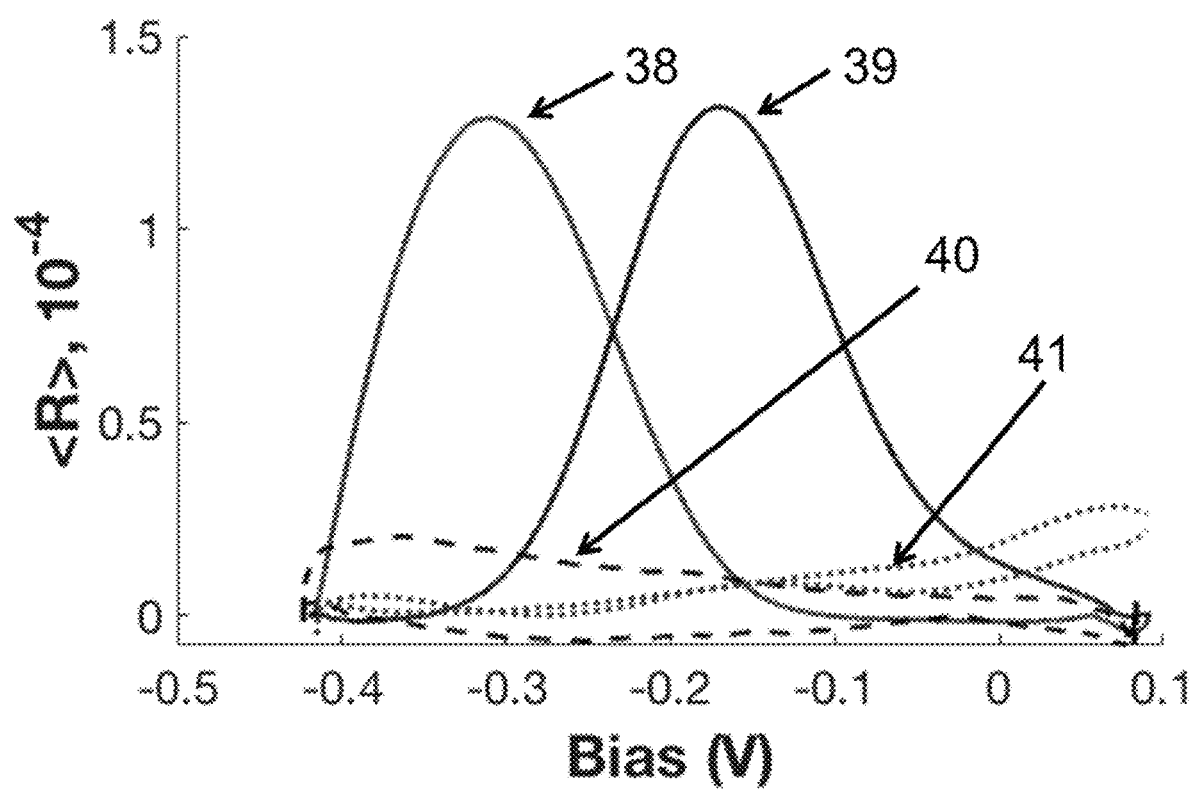
FIG. 5: Data by SEED demonstrating no change in electrochemical signal by SEED on binding with target when the short and long chain are of comparable length.

Example 2: Long Chain of Same Length as Short Chain is not Effective Probe Design This example demonstrates the principle of binary probe design. The process is similar to Example 1 where the only difference was that S1 was replaced by S2. The L1 and T1 were the same. FIG. 5 shows the SEED signal after S2 and MCH immobilization, that is Steps 1 to 3 in FIG. 2. The SEED signal showed a strong reduction (38) and oxidation (39) peaks for MB. The lower peaks compared to reduction (32) and oxidation (33) peaks for S1 was attributed to longer chain length of S2 that decreases the fraction of short chains absorbed on the Au electrode. In Step 4 in FIG. 4, the L1 is dispensed on S2 to form binary probes. The SEED signal, in Step 5 in FIG. 2, showed that the reduction and oxidation (40) peaks decreased significantly. In Step 6 in FIG. 2, the chip was exposed to binding with T1 at concentration of 1 µM, same as Example 1. However, unlike in Example 1 the signal did not increase. The reduction and oxidation (41) peaks remained significantly low indicating that S1 was not released. The observation was attributed to lack of L1-T1 binding due to the low thermodynamic driving force, that is, the free energy change, $(E_2-E_1)$ and $(E_4-E_3)$ are virtually the same diminishing the driving force for displacement reaction.

Example 3: Binding of the Target to the Binary Probe is Quantitative

The molecular monolayer with binary probes were fabricated in Steps 1 to 4 in FIG. 2 on three different chips using process conditions, short chain (S1) and long chain (L1), similar to Example 1. In Step 5 in FIG. 2, the SEED signal of the binary probe was measured. The reduction and oxidation (42) peaks for the first chip was significantly low, virtually zero. The chip 2 and 3 showed similar characteristics. In Step 6 in FIG. 2, the chips 1 to 3 were independently immersed in target solution of T1 of concentrations, 1 femtomolar (fM), 1 picomolar (pM) and 1 nanomolar (nM), respectively. In Step 7 in FIG. 2, the SEED signal after binding to the target was measured for each chip. The SEED signal for reduction and oxidation for 1 fM were (43) and (44), respectively. The SEED signal for reduction and oxidation for 1 pM were (45) and (46), respectively. The SEED signal for reduction and oxidation for 1 nM were (47) and (48), respectively. As the concentration of T1 increased, both the oxidation and reduction peaks increased. The systematic increase in the signal was attributed to increase in L1-T1 binding as T1 concentration increased leading to more release of S1 to cause an increase in MB redox. The systematic increase in the peaks for reduction and oxidation as target concentration increases shoed that the method can quantify the target concentration.

Example 4: Nonspecific Long Chain does not Form a Binary Probe

Figure 7:
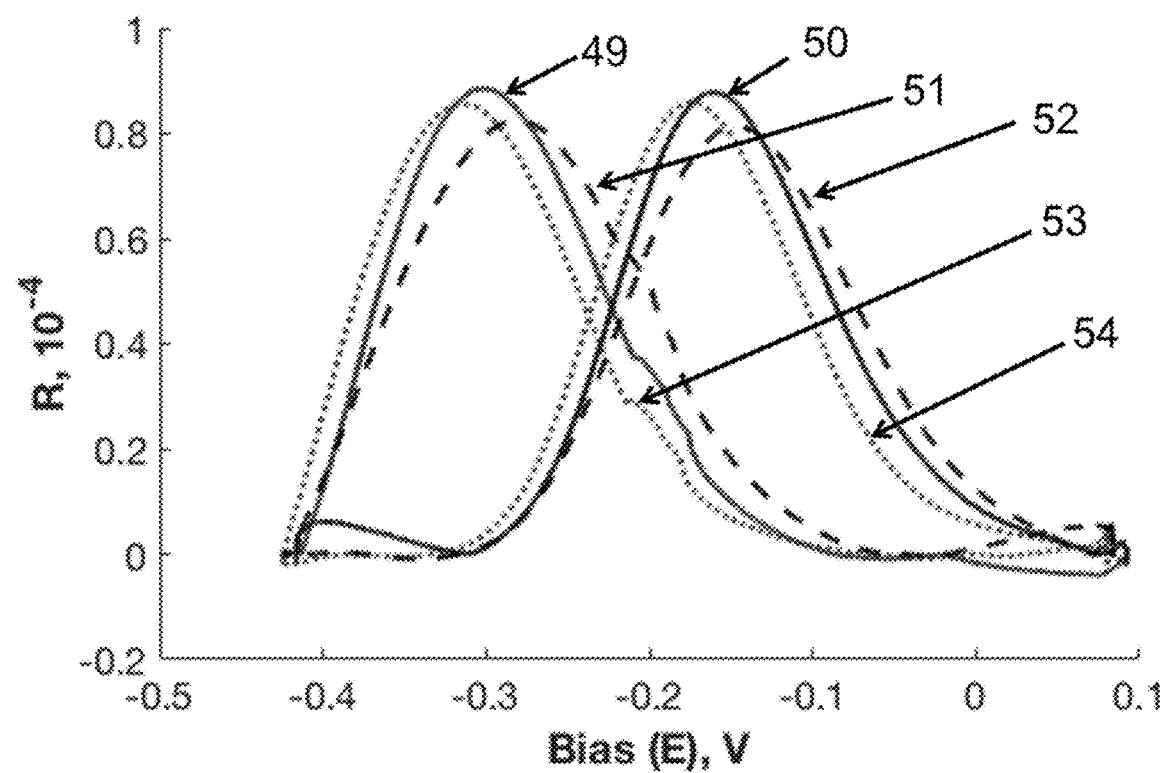
FIG. 7: Data by SEED showing the effect of non-specific long chain on the formation of binary probe.

The chip was fabricated from Step 1 to 3 in FIG. 2 with similar process conditions as Example 1. However, the short chain was S3 rather than S1. The SEED signal in FIG. 7 showed a significant reduction (49) and oxidation (50) peaks. The height of the peak was different than for short chain with similar structure in Example 1. The difference between (32) and (49) for reduction, and (33) and (50) for oxidation, was attributed to difference in the sequence of S1 and S3 that changed the fraction of short chains adsorbed on the electrode. In Step 4 in FIG. 2, 1 µM solution of L1 was dispensed to form binary probes. After the binding and washing, in Step 5 in FIG. 2, the SEED signal showed that the reduction (51) and oxidation (52) was relatively unchanged with respect to just the short chain (49) and (50), respectively. The insignificant change is attributed to no binding between the long and short chain due to non-complimentary sequence. As a result, the fraction of short chains adsorbed on the electrode was not affected by nonspecific long chains L1. Next, in Step 6 in FIG. 2, the chip was exposed to 1 nM of T1. After washing, in Step 7 in FIG. 2, the reduction (53) and oxidation (54) peaks do not change significantly. No significant change in SEED signal indicates that no significant binding to T1 had occurred. The example has two primary inference: First, the signature of successful fabrication of binary probe is the low signal in Step 5 in Example 2. If the signal peak does not diminish significantly after binding to long chain, the binary probe fabrication has not occurred significantly. Second, if the binary probe has not formed, exposer to the target does not cause a change in signal.

Example 5: Binding to the Binary Probe has High Specificity

Figure 6:
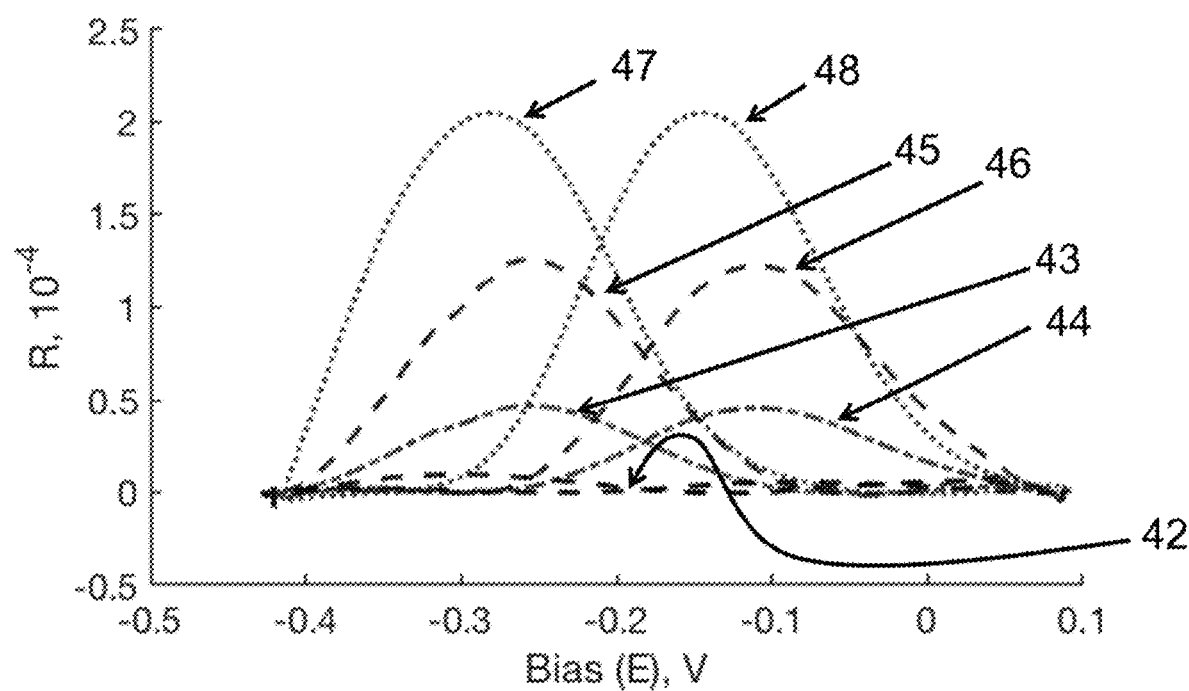
FIG. 6: Data showing the effect of target concentration on the change in electrochemical signal by SEED.
Figure 8:
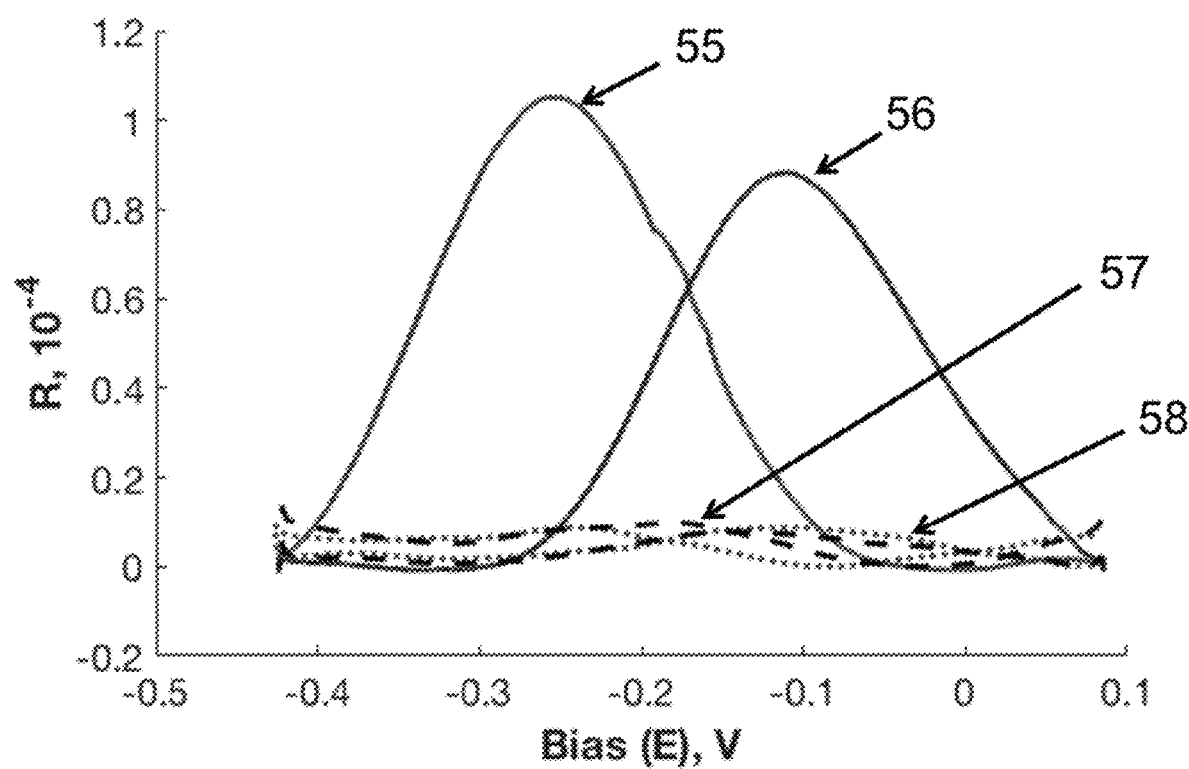
FIG. 8: Data by SEED showing change in redox signal for binding between non-specific target and the long chain.

The chip was fabricated from Step 1 to 3 in FIG. 2 with similar process conditions as Example 1. However, the short chain was S4 rather than S1. The SEED signal, in FIG. 8, showed a significant reduction (55) and oxidation (56) peaks. The height of the peak was different than for short chain with similar structure in Example 1. The difference between (32) and (55) for reduction, and (33) and (56) for oxidation, was attributed to difference in the sequence of S1 and S4 that changed the fraction of short chains adsorbed on the electrode. In Step 4 in FIG. 2, 1 µM solution of L2 was dispensed to form binary probes. After the binding and washing, in Step 5 in FIG. 2, the SEED signal showed that the reduction and oxidation peaks (57) was significantly reduced. The high reduction, similar to FIGS. 4 and 6, indicates the formation of binary probes. Next, in Step 6 in FIG. 2, the chip was exposed to 1 nM of T1. After washing, in Step 7 in FIG. 2, the reduction and oxidation (58) peaks do not change significantly. No significant change in SEED signal indicates that no significant binding to L2-T1 had occurred. As L2 does not have a an active region that can bind with T1, no binding indicated that the binary probes are specific to targets complimentary to their active region. Thus, the binary probs are highly specific.

Example 6: Kinetics of Binding to Detect Mutation

Figure 9:
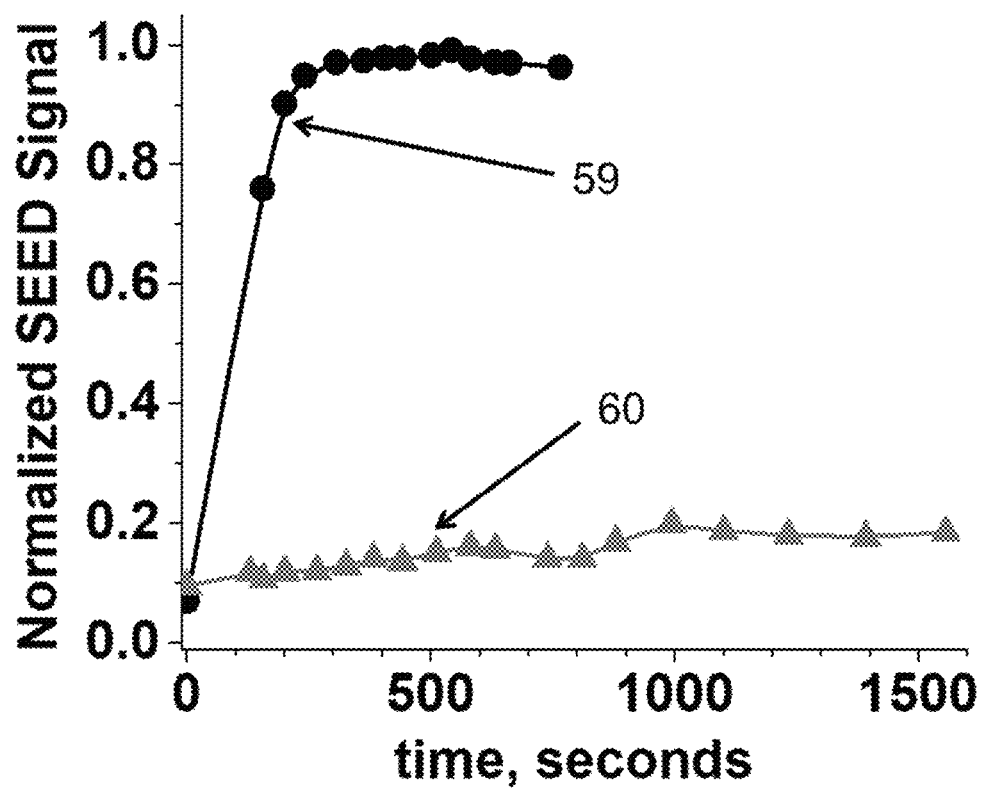
FIG. 9: Data by SEED comparing on kinetics of binding of perfectly complimentary target and targe with a single base mismatch.

Two chips with identical conditions were fabricated from Step 1 to 5 in FIG. 2 with similar process conditions as Example 1. However, the short chain was S5 rather than S1, and the long chain was L3 rather than L1. As only one type of binary probe was required, no local dispensing was required. The spot was the whole electrode, schematically shown as feature (9) in FIG. 1(*c*). To measure the kinetics the first and second chip were exposed to 1 µM of T2 and T3 in 1 M sodium acetate solution, respectively. The SEED signal shown was measured in real time in 1 M Sodium acetate solution. The maximum of the reduction peak as a function of time shown in FIG. 9 for the two chips is significantly different. For Chip 1 exposed to T2 that is perfectly complimentary to the active region the signal (59) rises rapidly and saturates. The increase in signal indicates binding between L3-T2 leading to release of short chain S5 to cause the redox signal of MB to increase. Chip 2 was exposed to T3 that had a mismatch in the active region where the 20th base in T3, that is underscored, did not match with 4th base of L2 leading to single base mismatch in the active region. As a result, the signal (60) does increase significantly. The low signal indicates poor binding between L3-T3 leading to no significant release of short chain S5 to cause virtually no increase in the redox signal of MB. Thus, from the large difference in the binding kinetics the method allows measurement of single base alteration in the target sequence relative to the fixed complementary active region in the long chain. Those skilled in the art will realize that the ability to measure single base change translates to detecting single base mutation.

Example 7: Local Deposition of Molecular Brush

Figure 10:
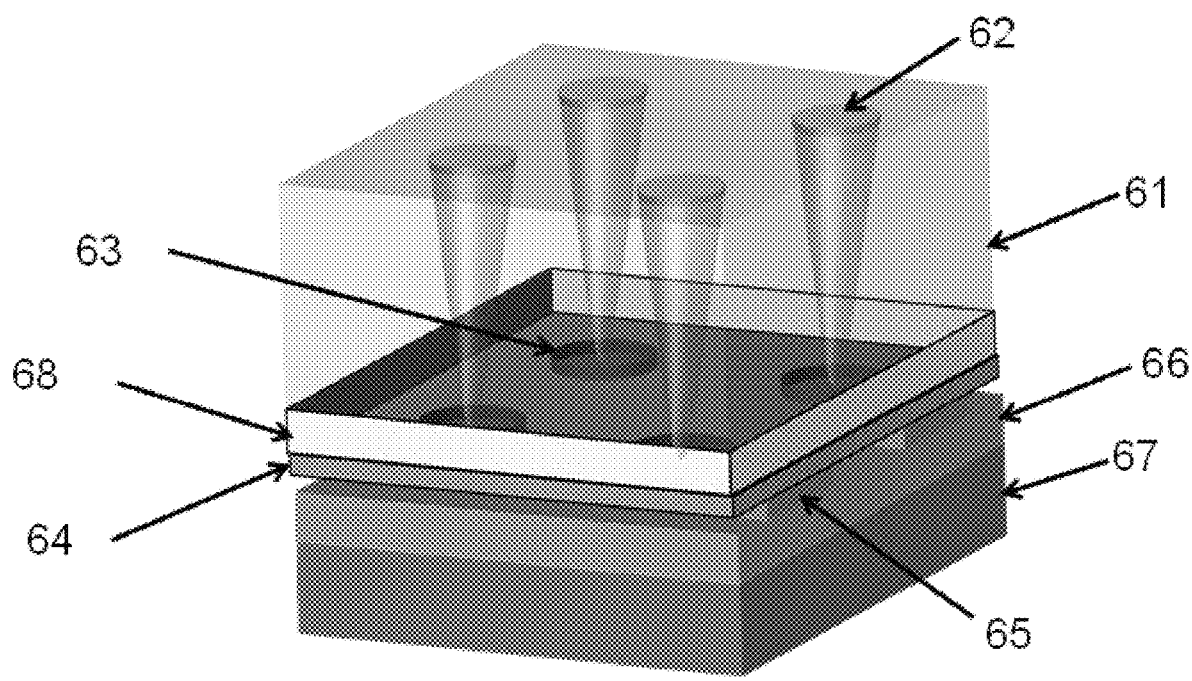
FIG. 10: Schematic of an array of funnels for local dispensing of solution on the electrode.

As shown in FIG. 10, the molecular brush can be fabricated locally on the electrode using a monolith solid (61) with conduit (62) to dispense the solution at the microwell (63) etched in the photoresist (64) as described in FIG. 1(*c*) and FIG. 1(*d*). The conduit (62) is a thru hole from top to the bottom surface. The microwell (63) exposes the solution to the underlying electrode (65) on the insulating surface (66) of the substrate (67) as described in FIG. 1(*a*) and FIG. 1(*b*). The contact between the microfunnel and the photoresist may be hermetically sealed by a gasket (68). To aid in easy visualization, in the drawing, the hole in the gasket to allow fluid to flow into the microwell (63) is not shown. The size of the hole in the gasket may be larger or smaller than the size of the microwell (63) etched in the photoresist (64). The gasket also inhibits mixing of the solution dispensed in each conduit or microfunnel (62). The gasket may not be necessary if the photoresist film (64) and/or the solid (61) are reasonably compliant to make a hermetic seal. The solid with the conduits may be mad by 3D printing. The fluid may be dispensed at the top entrance of the conduit by a syringe or a pipette (62). Alternatively, the fluid may be dispensed by a syringe or a pipette tip that may be inserted deeper into the conduit such that it is in close proximity but not touching the electrode surface. The fluid is a solution.

The invention claimed is:

1. A molecular monolayer film binary probe, for analyzing a target nucleic acid, the probe being covalently bound to an electrode surface, comprising:
   a short chain of nucleic acid (NA) or peptide nucleic acid (PNA) tethered to the electrode at one end by a covalent bond via a reactive group,
   a redox active compound (RCA) at the other end of the said short chain that can undergo an electrochemical reaction at the electrode,
   a long chain of NA or PNA that has a segment of contiguous complimentary base sequence that bind to a segment of short chain to form a double stranded nucleic acid,
   a portion of free segment of long chain that does not bind to the short chain,
   an active region in the long chain of contiguous complimentary base sequence to specifically binds to a particular target NA, such that on binding of the said target to the said active region the long chain causes the long chain to leave the binary probe, so that the electrochemical reaction of the RCA from the short chain at the electrode increases.

2. The binary probe as claimed in claim 1 wherein the short chain is a peptide nucleic acid (PNA).

3. The binary probe as claimed in claim 1 wherein the long chain is a PNA.

4. The binary probe as claimed in claim 1 wherein the long and short chains do not form folded, self-binding structures.

5. The binary probe as claimed in claim 1 wherein the short chain is composed of less than 30 NA bases.

6. The binary probe as claimed in claim 1 wherein the long chain is composed of less than 100 NA bases.

7. The binary probe as claimed in claim 1 wherein the long chain is at least 3 bases longer than the short chain.

8. The binary probe as claimed in claim 1 wherein the long and short chains bind over at least 5 bases.

9. The binary probe as claimed in claim 1 wherein the active region in the long chain is at least 6 bases long.

10. The binary probe as claimed in claim 1 wherein the binding energy between the target NA and the long chain in the active region is stronger than the specific binding between the long chain and the short chain.

11. The binary probe as claimed in claim 10 wherein to enhance binding energy between the particular target and the long chain, the long chain has locked-nucleic acid (LNA) monomer units in the active region.

12. The binary probe as claimed in claim 1 wherein the electrode unoccupied by the probes is backfilled by immobilizing inert agents that bind to the electrode.

13. The binary probe as claimed in claim 1 wherein the RAC is a redox active organic compound.

14. The binary probe as claimed in claim 1 wherein top surface of the electrode is an oxide free conducting surface.

15. The binary probe as claimed in claim 1 wherein the electrochemical reaction of RCA on the electrode is measured in real time during binding by amperometric and optical electrochemical methods.

16. The binary probe as claimed in claim 1 wherein the electrode is deposited on a hard and smooth substrate including circuit lines to apply electric potential and measure current.

17. The binary probe as claimed in claim 16 wherein more than one electrode is deposited on the hard and smooth substrate.

18. The binary probe as claimed in claim 16 further including a monolith solid having one or more conduits to locally dispense solutions in order to fabricate the binary probe on the electrode.

19. The binary probe as claimed in claim 1 wherein the electrode has multiple spots of binary probes with different active regions in the long chain.

20. The binary probe as claimed in claim 19 further including a monolith solid having one or more conduits to locally dispense a solution of targets to bind to the binary probe on the electrode.

* * * * *

SEQUENCE LISTING

```
Sequence total quantity: 11
SEQ ID NO: 1            moltype = DNA  length = 15
FEATURE                 Location/Qualifiers
source                  1..15
                        mol_type = other DNA
                        organism = synthetic construct
SEQUENCE: 1
aacccctatc acgat                                                       15

SEQ ID NO: 2            moltype = DNA  length = 24
FEATURE                 Location/Qualifiers
source                  1..24
                        mol_type = other DNA
                        organism = synthetic construct
SEQUENCE: 2
aacccctatc acgattagca ttaa                                             24
```

-continued

```
SEQ ID NO: 3              moltype = DNA   length = 22
FEATURE                   Location/Qualifiers
source                    1..22
                          mol_type = other DNA
                          organism = synthetic construct
SEQUENCE: 3
acaaccagct aagacactgc ca                                                22

SEQ ID NO: 4              moltype = DNA   length = 12
FEATURE                   Location/Qualifiers
source                    1..12
                          mol_type = other DNA
                          organism = synthetic construct
SEQUENCE: 4
cactgcaccg cg                                                           12

SEQ ID NO: 5              moltype = DNA   length = 15
FEATURE                   Location/Qualifiers
source                    1..15
                          mol_type = other DNA
                          organism = synthetic construct
SEQUENCE: 5
tgccctactc ttcgc                                                        15

SEQ ID NO: 6              moltype = DNA   length = 24
FEATURE                   Location/Qualifiers
source                    1..24
                          mol_type = other DNA
                          organism = synthetic construct
SEQUENCE: 6
ttaatgctaa tcgtgatagg ggtt                                              24

SEQ ID NO: 7              moltype = DNA   length = 22
FEATURE                   Location/Qualifiers
source                    1..22
                          mol_type = other DNA
                          organism = synthetic construct
SEQUENCE: 7
agggacggga cgcggtgcag tg                                                22

SEQ ID NO: 8              moltype = DNA   length = 23
FEATURE                   Location/Qualifiers
source                    1..23
                          mol_type = other DNA
                          organism = synthetic construct
SEQUENCE: 8
gatgagatgc gaagagtagg gca                                               23

SEQ ID NO: 9              moltype = DNA   length = 24
FEATURE                   Location/Qualifiers
source                    1..24
                          mol_type = other DNA
                          organism = synthetic construct
SEQUENCE: 9
aacccctatc acgattagca ttaa                                              24

SEQ ID NO: 10             moltype = DNA   length = 23
FEATURE                   Location/Qualifiers
source                    1..23
                          mol_type = other DNA
                          organism = synthetic construct
SEQUENCE: 10
tgccctactc ttcgcatctc atc                                               23

SEQ ID NO: 11             moltype = DNA   length = 23
FEATURE                   Location/Qualifiers
source                    1..23
                          mol_type = other DNA
                          organism = synthetic construct
SEQUENCE: 11
tgccctactc ttcgcatctg atc                                               23
```